United States Patent [19]

Huntington

[11] 3,984,217

[45] Oct. 5, 1976

[54] WET GAS CLEANING SYSTEM

[75] Inventor: Robert G. Huntington, Louisville, Ky.

[73] Assignee: American Air Filter Company, Inc., Louisville, Ky.

[22] Filed: Feb. 14, 1975

[21] Appl. No.: 549,990

[52] U.S. Cl. .................................... 55/20; 55/223
[51] Int. Cl.² .................. B01D 47/06; B01D 47/10
[58] Field of Search .............. 55/20, 22, 84, 85, 68, 55/73, 93, 94, 223

[56] References Cited
UNITED STATES PATENTS

| | | | |
|---|---|---|---|
| 2,664,968 | 1/1954 | Wood | 55/22 |
| 2,677,439 | 5/1954 | Hedberg | 55/22 |
| 2,935,375 | 5/1960 | Boucher | 55/257 C |
| 2,953,218 | 9/1960 | Coates | 55/22 |
| 3,183,645 | 5/1965 | Teller | 55/20 |
| 3,396,514 | 8/1968 | Hurst et al. | 55/22 X |
| 3,613,333 | 10/1971 | Gardenier | 55/223 X |
| 3,726,065 | 4/1973 | Hausberg et al. | 55/223 |
| 3,795,486 | 3/1974 | Ekman | 55/223 X |

OTHER PUBLICATIONS

"Flue Gas Desulfurization" Joy Manufacturing Co., 6/72.

Primary Examiner—Frank A. Spear, Jr.
Assistant Examiner—Ethel R. Cross

[57] ABSTRACT

A wet gas cleaning system and process for removing particulates from a dirty process air stream including means for introducing the dirty process gas into a drying chamber and simultaneously therewith spraying or otherwise re-introducing the removed particulates or solids in finely divided form as a slurry into the chamber, collecting agglomerated particulates resulting from drying of the mixture or process gas and slurry in a separator while passing the resulting gas stream containing the remaining fine particulates into a high energy wet scrubber and simultaneously therewith introducing a recycled scrubber solution thereto and removing the remaining fine particulates from the scrubber in the form of a slurry.

9 Claims, 3 Drawing Figures

WET GAS CLEANING SYSTEM

BACKGROUND OF THE INVENTION

This invention relates to an improved method of recovering particulates from a hot dirty process gas stream in dry form and more particularly, relates to a method for removing particulates from a dirty process gas stream utilizing a slurry recycle system as means for removing particulates from the stream. Even more particularly, the invention relates to an improved method for disposing of recycle slurries and dust in a form more convenient than conventional means including thickening, liquid filtration, and the like.

In the processing of dirty gases evolving from basic oxygen furnaces, electric arc furnaces, rotary kilns or other chemical processes, several methods have been suggested for cleaning or removing the fine particulates from the dirty gas stream. In many instances electrostatic precipitators or wet scrubbers have been utilized, or combinations of these two types of devices have been used for cleaning dirty gas streams. In the case of wet scrubbers, it has been necessary to utilize other clarification equipment in combination with the wet scrubbing equipment whereas in the case of electrostatic precipitators, expense as well as further clarification of the dirty gas stream have presented problems.

SUMMARY OF THE INVENTION

The present invention, recognizing the disadvantages of past systems, provides an efficient method for treating waste gases eminating from metallurgical furnaces as well as other chemical processing equipment, the present invention eliminating the need for water clarification equipment as well as the need for great quantities of cooling water from external sources and other auxiliary equipment.

Various other features of the present invention will become obvious to one skilled in the art upon reading the disclosure set forth hereinafter.

More particularly, the present invention provides a process for removing particulates from a hot dirty process gas stream comprising the steps of: passing a hot dirty process gas stream into a drying chamber and simultaneously therewith spraying a first slurry into the chamber, the first slurry being directed into the process gas stream thereby cooling the process gas stream and forming particulates therein; passing the resulting cooled gas stream into a separator whereby particles are separated from the gas stream; withdrawing the separated particles from the separator; passing the gas stream from the separator into a wet scrubber and simultaneously therewith spraying a second slurry into the gas stream thereby forming a slurry with the fine particles included therein; withdrawing in separate streams the slurry and residual gas stream from the scrubber.

It is to be understood that various changes can be made by one skilled in the art in the several steps of the methods set forth herein without departing from the scope of the present invention.

Referring to the drawing.

Figure 1:
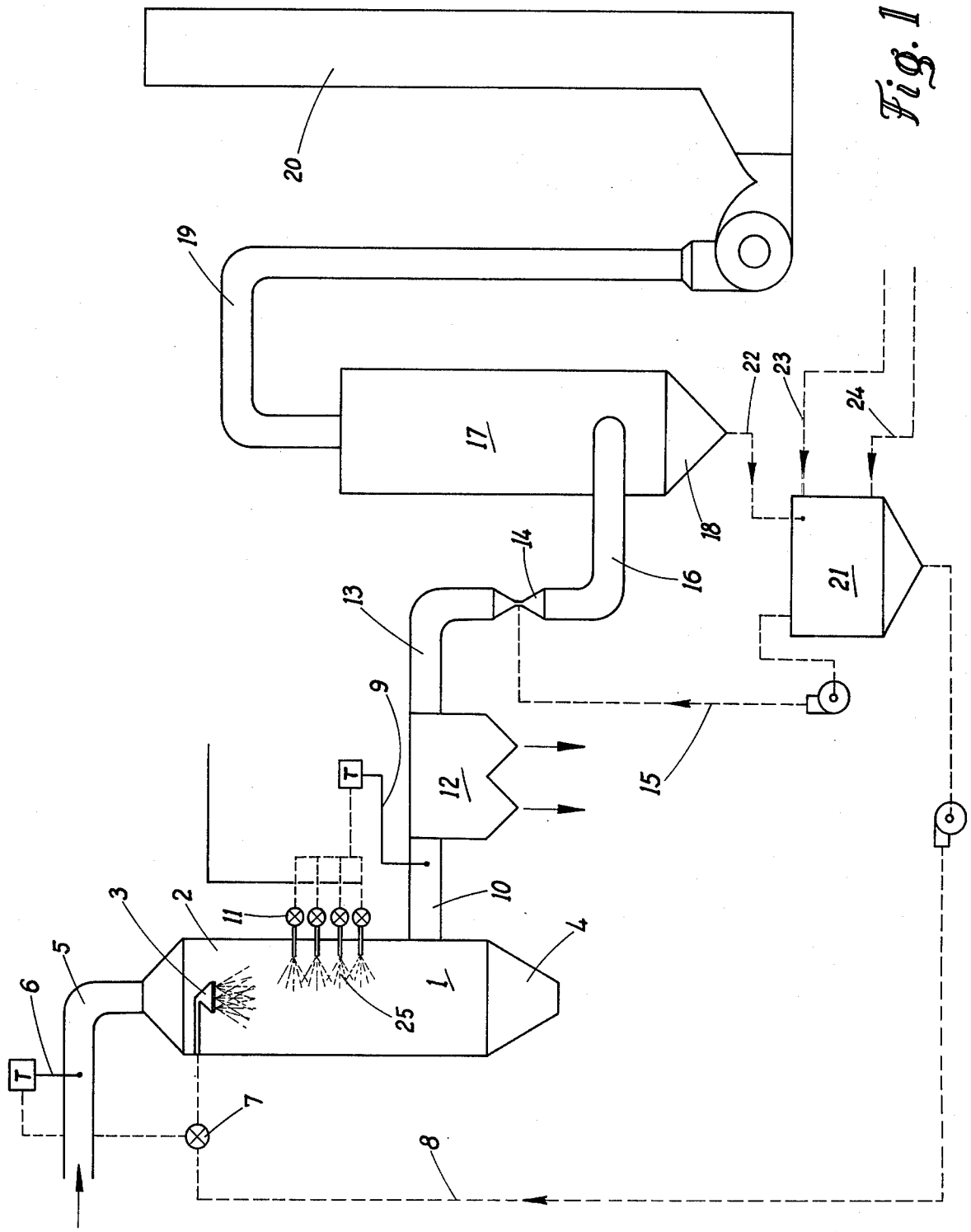
FIG. 1 is a schematic flow diagram of a preferred novel process for removing particulates from a hot process gas stream.

Referring to FIG. 1 of the drawing, dirty process gas eminating from a source (not shown), such as a metallurgical furnace, is introduced into a spray dryer 1 through conduit 5, spray dryer 1 being any one of several types known in the art. The hot process gases are introduced at the top portion 2 of the spray dryer 1 and brought into contact with a first slurry sprayed into the spray dryer through slurry spray nozzles 3. Upon mixing the particulate materials in the process gases with the sprayed slurry, particulate materials from the gas stream combine with the solid particles in the slurry as the liquid portion of the slurry vaporizes, the combined particulates forming an agglomeration and the vaporized liquid becoming a part of the hot gas stream. The large or heavier agglomerated particles fall to the bottom portion 4 of the spray dryer 1 and are removed therefrom by any known means. The spray dryer 1 may also be provided with a fresh water cooling spray such as the one identified by the numeral 25 which is utilized to cool the process gases even more, if necessary.

Figure 2:
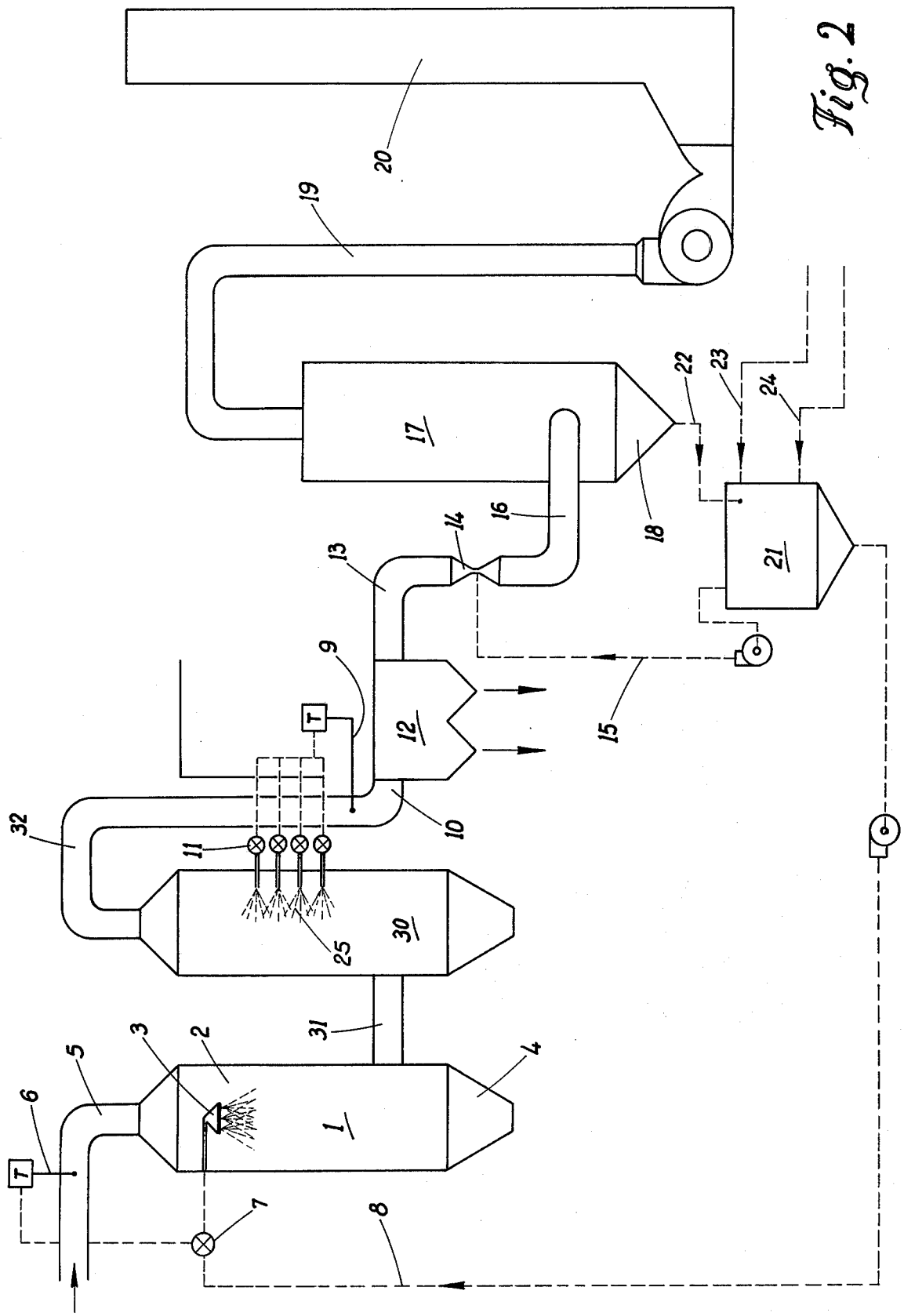
FIG. 2 is a schematic flow diagram of another preferred novel process for removing particulates from a hot process gas stream; and, FIG. 3 is a modification of the novel arrangement of the process of FIG. 1.

In another preferred embodiment, as shown in FIG. 2, the cooling of the process gases is carried out in a separate cooling chamber 30. In this embodiment, hot gases exit through conduit 31 and flow upwardly through chamber 30 exiting therefrom through conduit 32. Cooling liquid is sprayed downwardly through the upcoming gases through nozzles 5. The spray through nozzles 25 is controlled by a temperature sensing device 9 disposed within conduit 32, sensing device 9 actuating control valves 11 in response to the preselected temperature.

A first temperature control means is provided with a temperature sensing device 6 in the inlet stream to the spray dryer, the temperature sensing device being in contact with a flow valve 7 which is disposed in the slurry line 8, slurry line 8 providing the slurry to the spray dryer 1. The slurry utilized is the underflow from a recycle tank 21, the slurry being a thickened agglomerated recycle solution which is obtained from the system at a point downstream of the spray dryer 1, the recycle solution being discussed in more detail hereinafter.

A second temperature control means is also provided with a temperature sensing device 9 in a duct 10, duct 10 being the exiting gas duct from the spray dryer 1, the duct 10 carrying the processed gas and vaporized liquid from the spray dryer 1 to a centrifugal collector 12 where the spray dried dust and other particulate matter are removed from the gas stream. The second temperature sensing device 9 is in communication with fresh water control valve 11 which provide cooling water for the spray dryer 1 thereby maintaining a preselected temperature of the exiting gases from the spray dryer 1.

Gases leaving the centrifugal collector 12 containing fine particulate matter which was not removed by the centrifugal collector 12 then passes to a venturi scrubber 14 through duct 13 wherein a slurry containing processed dust is brought in contact with the gas by way of feed line 15, the slurry being the overflow from the recycle tank 21. From the venturi scrubber 14 the wetted gas stream passes into a centrifugal separator 17 by means of duct 16 with the wetted particles being separated from the wetted gas stream in the form of a slurry and caught in the hopper 18 of the separator 17, the resulting cleaned gases being removed from the top of the separator 17 through duct 19 and out to the atmosphere through stack 20. It is realized that a single high energy wet scrubber may be utilized in place of the venturi scrubber 14 in combination with the centrifugal separator 17, but this arrangement has proved to be a preferred apparatus for carrying out the process of the instant invention.

A recycle tank 21 is provided to receive the slurry coming from the separator 17 by means of line 22. The slurry is generally allowed to settle in the recycle tank 21 wherein the recycle tank 21 is provided with the underflow feed line 8 for the spray dryer 1 and the overflow feed line 15 for the venturi scrubber 14. Fresh water make up for evaporative losses in the process are provided for the recycle tank 21 through line 23 and in the case of scrubbing in chemical processing, a neutralizing feed line 24 is provided for adjusting the pH of the solution, as necessary, at the recycle tank 21.

Figure 3:
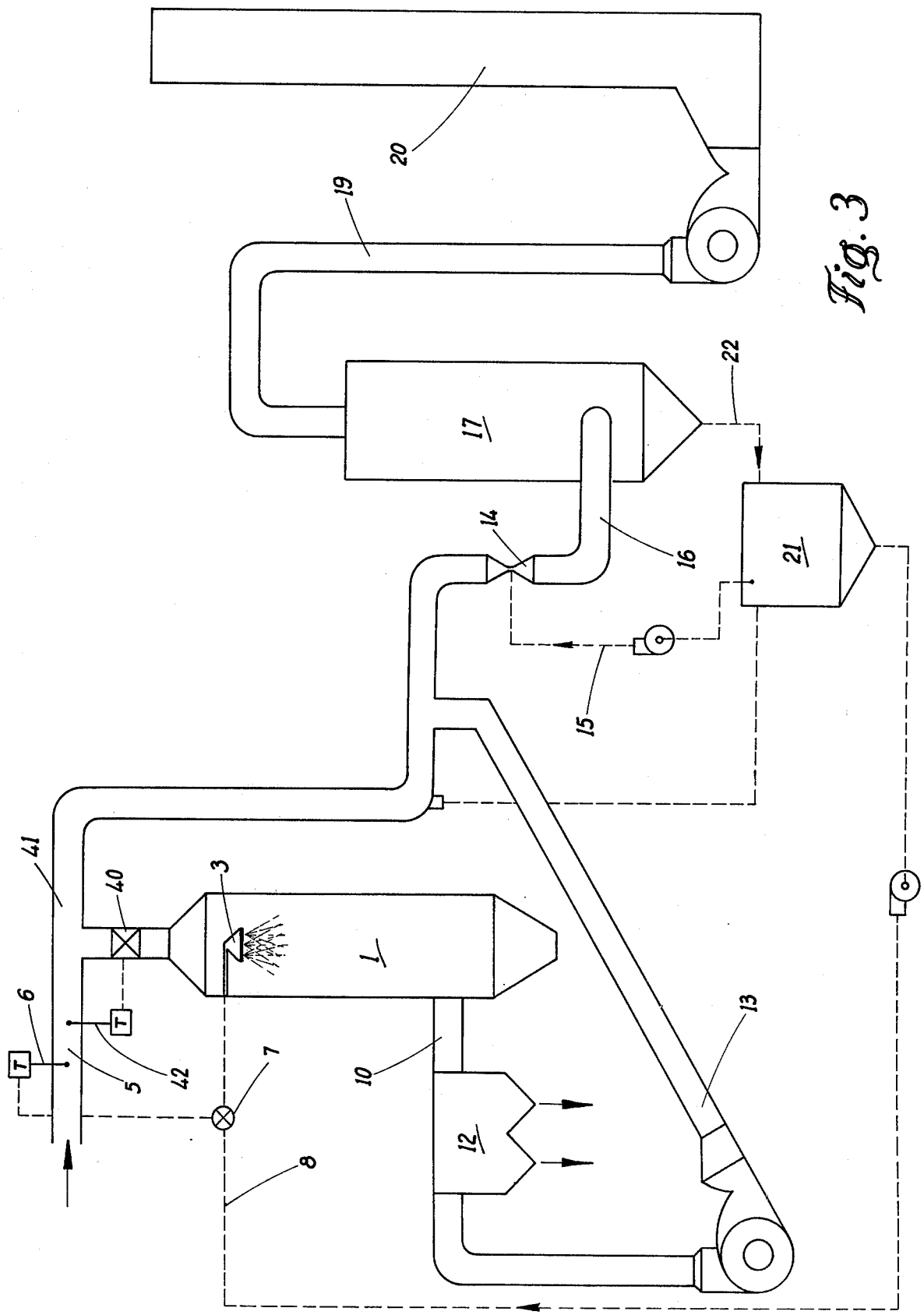

In FIG. 3 of the drawing, substantially the same system is disclosed as shown in FIG. 1 but with an additional feature added. In this Figure, the incoming hot process gas is split into two streams, one of the streams passing around the spray dryer 1 and centrifugal collector 12 through conduit 41. These dirty process gases are then mixed with the processed gas leaving the centrifugal collector 12 just prior to entrance into the venturi scrubber 14. In this particular arrangement, a control valve 40 is installed upstream of the spray dryer to distribute the flow between the spray dryer 1 and the venturi scrubber 14, control valve 40 being operative in response to a preselected temperature setting as sensed by temperature sensing device 42 disposed in incoming process gas stream 5.

It is realized that various other changes may be made to the embodiment shown and described without departing from the scope and spirit of the present invention.

What is claimed is:

1. A process for removing particulates from a hot dirty process gas stream comprising the steps of:
    monitoring the temperature of a hot dirty process gas stream prior to said gas stream entering a drying chamber;
    passing said hot dirty process gas stream into said drying chamber and simultaneously therewith spraying a first slurry into said chamber, said first slurry being directed into said process gas stream at a preselected rate determined by said temperature of said gas stream entering said drying chamber thereby cooling said process gas stream and forming particulates therein;
    monitoring the temperature of the resulting cooled gas stream leaving said drying chamber and simultaneously therewith adding cooling water to said drying chamber at a preselected rate determined by said temperature of said gas stream leaving said drying chamber;
    passing the resulting cooled gas stream into a first separator whereby particulates are separated from said gas stream;
    withdrawing said separated particulates from said separator;
    passing said gas stream from said separator into a wet scrubber and simultaneously therewith spraying a second slurry into said gas stream thereby forming a resulting slurry with the fine particulates included therein; and,
    withdrawing in separate streams said resulting slurry and said residual gas stream from said scrubber, said withdrawn resulting slurry being separated into two streams, one of said streams being said first slurry the other of said streams being said second slurry.

2. The process of claim 1 wherein said first separator is a centrifugal collector.

3. The process of claim 1 wherein monitoring the temperature of a hot dirty process gas stream includes a first temperature control means, said first temperature control means includes a temperature sensing device disposed in said hot dirty process gas stream entering said drying chamber in combination with a control valve disposed in said first slurry entering said drying chamber thereby controlling the amount of said first slurry going into said chamber in response to the temperature of the incoming hot dirty process gas stream.

4. The process of claim 1 wherein monitoring the temperature of the resulting cooled gas stream includes a second temperature control means, said second temperature control means includes a temperature sensing device disposed in said gas stream leaving said first separator in combination with a control valve disposed in a cooling liquid conduit, said cooling liquid conduit being in fluid communication with said drying chamber whereby the amount of a cooling liquid being directed into said drying chamber is controlled in response to the temperature of the gas stream leaving said drying chamber.

5. The process of claim 1 wherein withdrawing said slurry from said scrubber includes collecting said slurry in a recycle tank and allowing said slurry to settle in said tank whereby the heavily concentrated slurry layer of said settled slurry is said first slurry and the slurry portion low in particulate concentration is said second slurry.

6. The process of claim 1 including the step of splitting said hot dirty process gas stream upstream of said drying chamber into two streams passing one stream into said drying chamber and simultaneously therewith mixing the other stream with said gas stream being passed into said wet scrubber.

7. The process of claim 6 including control means for controlling the flow of said other hot dirty process gas stream, said control means including a valve means disposed upstream of said drying chamber, said valve means being positioned to operate in response to a preselected temperature sensing means disposed in said hot dirty gas stream upstream of said drying chamber.

8. The process of claim 1 including the step of passing said resulting gas stream exiting from said drying chamber into a cooling chamber prior to passing said resulting gas stream into said first separator.

9. The process of claim 8 wherein a cooling liquid is sprayed into the flow of gas through said cooling chamber, the amount of cooling liquid sprayed being determined in response to a control means including a valve means disposed in a cooling liquid conduit in communication with said cooling chamber, said valve means being positioned to operate in response to a preselected temperature sensing means disposed in said gas stream exiting from said cooling chamber.

* * * * *